(12) United States Patent
Youn et al.

(10) Patent No.: US 7,859,133 B2
(45) Date of Patent: Dec. 28, 2010

(54) PORTABLE APPARATUS OF EMERGENCY POWER SUPPLY AND BATTERY CHARGER

(75) Inventors: Dae-Young Youn, Daejeon (KR); Hyun-June Kim, Daejeon (KR); Sang-Min Kim, Daejeon (KR); Suck Noh, Daejeon (KR)

(73) Assignee: Smart Power Solutions Inc., Daejeon (KR)

( * ) Notice: Subject to any disclaimer, the term of this patent is extended or adjusted under 35 U.S.C. 154(b) by 62 days.

(21) Appl. No.: 12/159,822

(22) PCT Filed: Dec. 13, 2005

(86) PCT No.: PCT/KR2005/004268

§ 371 (c)(1),
(2), (4) Date: Jul. 1, 2008

(87) PCT Pub. No.: WO2007/058402

PCT Pub. Date: May 24, 2007

(65) Prior Publication Data

US 2009/0026843 A1 Jan. 29, 2009

(30) Foreign Application Priority Data

Nov. 16, 2005 (KR) .................. 10-2005-0109478

(51) Int. Cl.
*H02J 5/00* (2006.01)
*H02J 7/04* (2006.01)
(52) U.S. Cl. .................. 307/66; 307/64; 307/65
(58) Field of Classification Search ............. 307/64–66
See application file for complete search history.

(56) References Cited

U.S. PATENT DOCUMENTS 4,321,523 A * 3/1982 Hammel .................. 320/139
4,636,703 A * 1/1987 Tohya et al. .............. 320/110

(Continued)

FOREIGN PATENT DOCUMENTS

KR     20-0268862     3/2002

(Continued)

OTHER PUBLICATIONS

International Search Report dated Aug. 8, 2006 for Serial No. PCT/KR2005/004268.

(Continued)

*Primary Examiner*—Jared J Fureman
*Assistant Examiner*—Adi Amrany
(74) *Attorney, Agent, or Firm*—Oppedahl Patent Law Firm LLC

(57) ABSTRACT

The present invention relates to a portable apparatus combining a battery charger with an emergency power supply, including: a hand-held body; an AC input section, a battery section; a DC output section; an LED display section; and a control circuit section. Accordingly, the inventive portable apparatus combining a battery charger with an emergency power supply functions as an adapter for supplying electric power to an electronic device and a charger for charging a battery contained therein when being applied with an external power supply, and functions as an emergency power supply for supplying proper electric power to the electric device using a built-in charged battery when being not applied with the external electric power supply.

5 Claims, 2 Drawing Sheets

U.S. PATENT DOCUMENTS

| | | | | |
|---|---|---|---|---|
| 4,860,185 | A * | 8/1989 | Brewer et al. | 363/41 |
| 5,331,212 | A * | 7/1994 | Johnson-Williams et al. | 307/66 |
| 5,459,389 | A * | 10/1995 | Fujiwara et al. | 320/111 |
| 5,497,245 | A * | 3/1996 | Uchida | 358/406 |
| 5,635,814 | A * | 6/1997 | Afzal et al. | 320/111 |
| 5,648,712 | A * | 7/1997 | Hahn | 320/111 |
| 5,686,808 | A * | 11/1997 | Lutz | 320/110 |
| 5,721,481 | A * | 2/1998 | Narita et al. | 320/111 |
| 5,847,545 | A * | 12/1998 | Chen et al. | 320/138 |
| 5,883,494 | A * | 3/1999 | Kobayashi et al. | 320/115 |
| 5,982,138 | A | 11/1999 | Krieger | |
| 6,275,002 | B1 * | 8/2001 | Chen | 320/111 |
| 6,392,381 | B1 * | 5/2002 | Chen | 320/111 |
| 6,456,035 | B1 * | 9/2002 | Crisp et al. | 320/106 |
| 6,483,273 | B1 * | 11/2002 | Lee | 320/111 |
| 6,894,457 | B2 * | 5/2005 | Germagian et al. | 320/119 |
| 6,950,320 | B2 * | 9/2005 | Shin | 363/21.15 |
| 7,338,328 | B2 * | 3/2008 | Krieger et al. | 439/668 |
| 7,408,272 | B2 * | 8/2008 | Marquet | 307/48 |
| 7,550,873 | B2 * | 6/2009 | Jiang et al. | 307/64 |
| 7,635,965 | B2 * | 12/2009 | Hinckson | 320/105 |
| 7,733,060 | B2 * | 6/2010 | Kojima | 320/125 |
| 7,759,816 | B2 * | 7/2010 | Krieger et al. | 307/9.1 |
| 2002/0154527 | A1 * | 10/2002 | Lin | 363/143 |
| 2004/0189253 | A1 * | 9/2004 | Tanabe et al. | 320/128 |
| 2005/0263596 | A1 * | 12/2005 | Nelson et al. | 235/441 |
| 2008/0061739 | A1 * | 3/2008 | Lu | 320/114 |
| 2008/0290834 | A1 * | 11/2008 | Umetsu | 320/107 |
| 2009/0010462 | A1 * | 1/2009 | Ekchian et al. | 381/312 |
| 2009/0295327 | A1 * | 12/2009 | Mcginley et al. | 320/111 |

FOREIGN PATENT DOCUMENTS

| | | |
|---|---|---|
| KR | 20-0399141 | 10/2005 |

OTHER PUBLICATIONS

Written Opinion of the International Searching Authority for related application PCT/KR2005/004268 mailed Aug. 8, 2006. (4 pages).

International Search Report for related application PCT/KR2005/004268 mailed Aug. 8, 2006. (1 page).

* cited by examiner

【Figure 1】
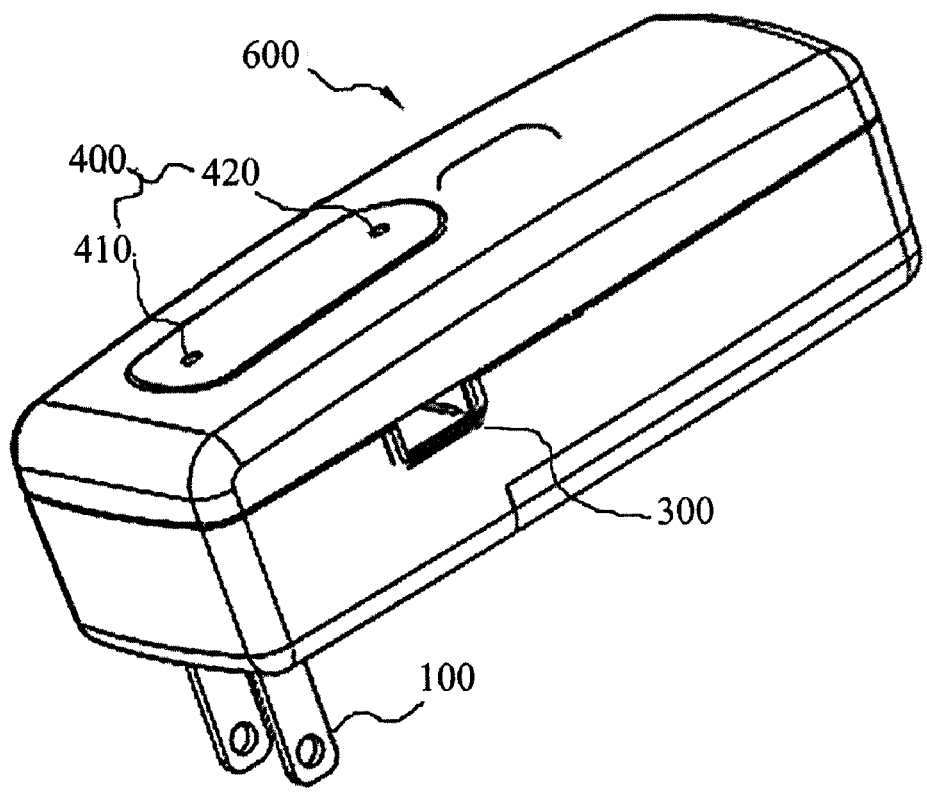
【Figure 2】
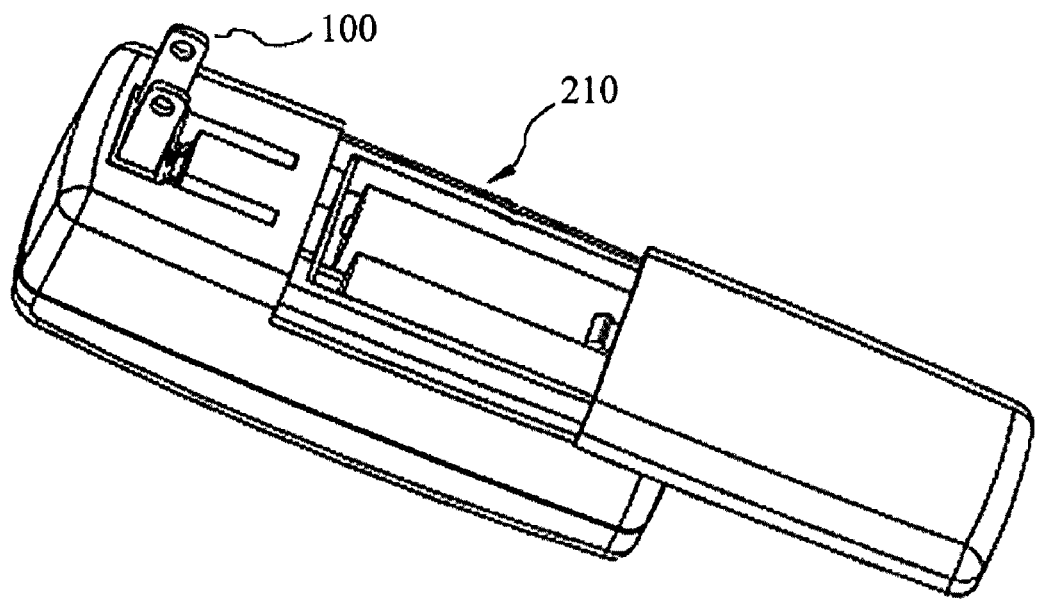

[Figure 3]
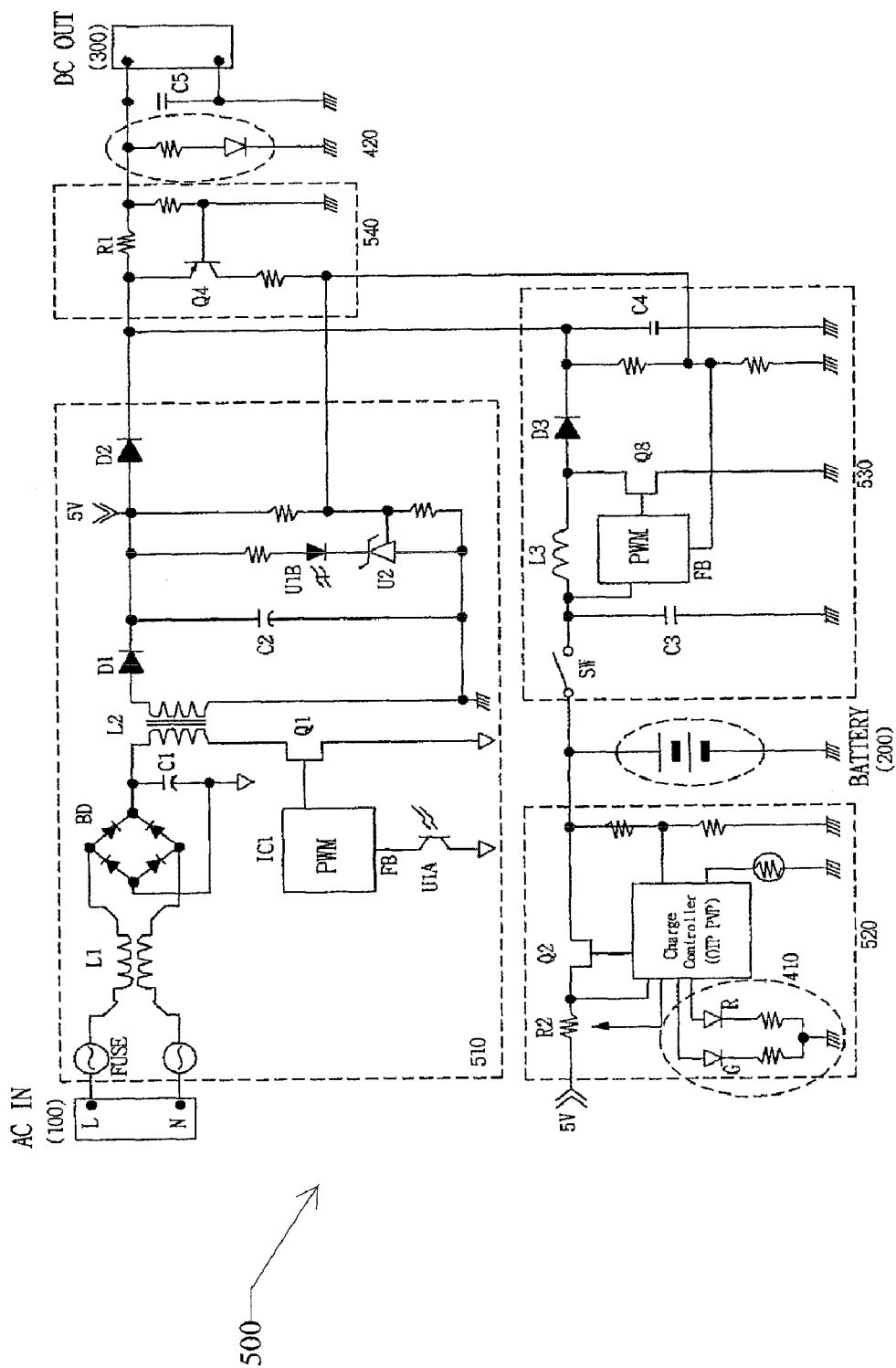

PORTABLE APPARATUS OF EMERGENCY POWER SUPPLY AND BATTERY CHARGER

TECHNICAL FIELD

The present invention relates to a combined battery charger and emergency power supply, and more particularly, to a portable apparatus of emergency power supply and battery charger, in which a battery contained therein is charged using an external electric power supply and electric power is supplied to a portable electric device using a built-in battery when being not applied with an external electric power supply.

BACKGROUND ART

A Portable electric apparatus such as cellular phones, personal digital assistants (PDA), portable digital versatile discs (DVDs), camcorders, digital cameras, etc., have a battery built therein for the purpose of using them when a user moves from a place to another. The portable electric apparatus employs a built-in battery in case of no an AC power supply. Such a built-in battery is used during a predetermined period of time. Thus, when the use time of the built-in battery exceeds the predetermined time period, the battery cannot be used any more.

A first method for addressing and solving this problem includes a provision of an external battery charger for recharging a spare battery. The external battery charger has a shortcoming in that it cannot be used in the case where there is no external power supply such as a home AC or DC power supply.

Secondly, if there is no the external power supply, an external battery can be used. A general external battery pack with a built-in secondary battery has a merit in that it can be used even in case of no electric power supply since it is internally attached with has a charge circuit and a DC/DC circuit fit for the power supply of an electronic device to be used.

However, such an external battery pack has a demerit in that it is expensive, and in that a charged battery therein cannot be replaced for other purpose since a pack battery is securely fixed thereto.

A third method for addressing and solving the above problem includes a provision of an emergency power supply employing a first battery and a secondary battery. This emergency power supply has an advantage in that it can utilize the first and secondary battery, since it is internally attached with a DC/DC circuit fit for the power supply of an electronic device, but not with a charge circuit. However, the emergency power supply has a disadvantage in that it cannot charge the secondary battery that has been used already.

DISCLOSURE OF INVENTION

Technical Problem

Accordingly, the present invention has been made to solve the above-described problems occurring in the prior art, and it is an object of the present invention to provide a portable apparatus combining a battery charger with an emergency power supply, which functions as an adapter for supplying electric power to an electronic device and a charger for charging a battery contained therein when being applied with an external power supply, and functions as an emergency power supply for supplying proper electric power to the electric device using a built-in charged battery when being not applied with the external electric power supply.

Technical Solution

To accomplish the above object, according to the present invention, there is provided a portable apparatus combining a battery charger with an emergency power supply, including: a generally rectangular parallelepiped body; an AC input section mounted at one side of the rear surface of the rectangular parallelepiped body for being supplied with AC power supply from the outside; a battery section formed inside the body for accommodating a battery, the battery accommodating section being adapted to charge or discharge the battery accommodated therein using the AC power supply applied thereto from the AC input section; a DC output section for outputting the AC power supply applied thereto from the AC input section or the power supply of the battery discharged from the battery accommodating section to the outside; an LED display section formed on the front surface of the body for displaying the operating state of the DC output section and the charge state of the battery received in the battery accommodating section; and a control circuit section for converting the AC power supply into DC power supply for application to the DC output section when the AC power supply is applied thereto from the AC input section, and for applying the power supply of the battery to DC output section when the AC power supply is not applied thereto from the AC input section.

Preferably, the control circuit section may include: the control circuit section of the present invention includes: an AC-to-DC converter for converting the AC power supply applied thereto from the AC input section into DC power supply for application to the DC output section; a charge controller for charging the battery with the power supply applied thereto from the AC-to-DC converter; a DC-to-DC converter for applying the power supply of the battery to the DC output section; and a current limit for interrupting the overcurrent of the power supply applied thereto from the AC-to-DC converter 510 and the DC-to-DC converter.

Preferably, the AC input section may be formed of a flip-type plug so that it can be retracted inwardly from the body and received in the body when not being used, and the battery may be an AA or AAA sized battery that is two to four in number.

More preferably, the DC output section may be a USB connector.

Preferably, the LED display section may include a first display portion for displaying the charge state of the battery received in the battery accommodating section and a second display portion for displaying the operating state of the DC output section.

BRIEF DESCRIPTION OF THE DRAWINGS

Further objects and advantages of the invention can be more fully understood from the following detailed description taken in conjunction with the accompanying drawings, in which:

FIG. 1 is a front perspective view illustrating the outer appearance of a portable apparatus combining a battery charger with an emergency power supply according to the present invention;

FIG. 2 is a rear perspective view illustrating the outer appearance of a portable apparatus combining a battery charger with an emergency power supply according to the present invention; and FIG. 3 is a circuit diagram illustrating a control circuit of a portable apparatus combining a battery charger with an emergency power supply according to the present invention.

EXPLANATION ON REFERENCE NUMERALS OF THE ESSENTIAL ELEMENTS OF THE DRAWINGS

| | |
|---|---|
| 100: AC input section | 200: battery |
| 300: DC output section | 400: LED display section |
| 410: first display portion | 420: second display portion 420 |
| 500: control circuit section | 510: AC-to-DC converter |
| 520: charge controller | 530: DC-to-DC converter |
| 540: current limit | 600: body |

BEST MODE FOR CARRYING OUT THE INVENTION

Now, an explanation of the preferred embodiment of the present invention will be in detail given with reference to attached drawings.

FIG. 1 is a front perspective view illustrating the outer appearance of a portable apparatus combining a battery charger with an emergency power supply according to the present invention, and FIG. 2 is a rear perspective view illustrating the outer appearance of a portable apparatus combining a battery charger with an emergency power supply according to the present invention; and As shown in FIGS. 1 and 2, the portable apparatus combining a battery charger with an emergency power supply according to the present invention includes: a generally rectangular parallelepiped hand-held body 600; an AC input section 100 mounted at one side of the rear surface of the rectangular parallelepiped body 600 for being supplied with AC power supply from the outside; a battery section 210 formed inside the body 600 for accommodating a battery 200, the battery accommodating section 210 being adapted to charge or discharge the battery accommodated therein using the AC power supply applied thereto from the AC input section 100; a DC output section 300 for outputting the AC power supply applied thereto from the AC input section 100 or the power supply of the battery discharged from the battery accommodating section 210 to the outside; an LED display section 400 formed on the front surface of the body 600 for displaying the operating state of the DC output section 300 and the charge state of the battery 200 received in the battery accommodating section 210; and a control circuit section 500 for converting the AC power supply into DC power supply for application to the DC output section 300 when the AC power supply is applied thereto from the AC input section 100, and for applying the power supply of the battery 200 to DC output section 300 when the AC power supply is not applied thereto from the AC input section 100.

The AC input section 100 is formed of a flip-type plug so that it can be retracted inwardly from the body 600 and received in the body when not being used. The battery 200 is an AA or AAA sized battery that is two to four in number. The DC output section 300 is a typical USB connector formed at a lateral portion of the body 600.

The LED display section 400 includes a first display portion 410 for displaying the charge state of the battery 200 received in the battery accommodating section 210 and a second display portion 420 for displaying the operating state of the DC output section 300.

FIG. 3 is a circuit diagram illustrating a control circuit of a portable apparatus combining a battery charger with an emergency power supply according to the present invention.

As shown in FIG. 3, the control circuit section 500 of the present invention includes: an AC-to-DC converter 510 for converting the AC power supply applied thereto from the AC input section 100 into DC power supply for application to the DC output section 300; a charge controller 520 for charging the battery 200 with the power supply applied thereto from the AC-to-DC converter 510; a DC-to-DC converter 530 for applying the power supply of the battery to the DC output section 300; and a current limit 540 for interrupting the overcurrent of the power supply applied thereto from the AC-to-DC converter 510 and the DC-to-DC converter 530.

The operation of the present invention as constructed above will be described in more detail hereinafter.

The AC input section 100 is a device for supplying AC home power supply. The AC input section is simple and easy to carry around since it is formed of a flip-type plug so that it can be received in the body when not being used.

The battery accommodating section 210 is a location where the battery is installed so that a secondary battery is charged or a discharge is enabled using a first/secondary battery. Preferably, two or four AA or AAA sized battery can be employed in the battery accommodating section 210. In this case, NiMH or NiCd is used a rechargeable battery.

The DC output section 300 is configured such that a USB connector is attached thereto so that a user having a USB cable fit for the shape of a DC input of a portable electronic device can use more conveniently it according to the purpose of the present invention for making it simple to carry around and supplying electric power supply to various electronic apparatus.

The LED display section 400 includes two LEDs such as a first display portion 410 for displaying the charge state of the battery 200 and a second display portion 420 for displaying the operating state of the inventive apparatus. Preferably, the LED of the first display portion 410 employs red and green colors so that the red color is displayed when the battery is charged and the green color is displayed when the battery is completely charged. The LED of the second display portion 420 displays the green color when AC or DC power supply is activated.

The control circuit section 500 used herein is made by constructing electronic circuits conforming to the object of the present invention, and a preferred embodiment of the control circuit section 500 is shown in FIG. 3.

Referring to FIG. 3, the control circuit section 500 of the present invention is constructed of an AC-to-DC converter 510 for converting home AC power supply into 5V DC power supply, a charge controller 520 for enabling the charge of the battery 200 as a secondary battery received in the battery accommodating section 210 with the 5V DC power supply applied thereto from the AC-to-DC converter 510, a DC-to-DC converter 530 for converting the power supply of the battery 200 to 5V DC power supply, and a current limit 540 for enabling the internal battery of various kinds of portable electronic apparatus whose loads have different sizes to effectively charged. The current limit 540 has a characteristic of commonly affecting the AC-to-DC converter 510 and the DC-to-DC converter 530.

The AC-to-DC converter 510 is a pulse width modulation (PWM)-type controller circuit having an EMI filter (L1), a bridge diode (BD), a transformer (L2), a feed-back signal and FET (Q1) drive capacity used in a flyback-type control circuit employed in a switching mode power supply (SMPS)-type adapter. In addition, the DC-to-DC converter 530 for converting the power supply of the battery to 5V DC power supply is a booster converter type PWM controller circuit used generally.

Also, the charge controller 520 is a circuit for charging two NiMH batteries 200 with 5V power supply applied thereto from the AC-to-DC converter 510. The charge controller 520 turns off a circuit for making the current detected by a resistor R2 be constant current (CC) and a switching element Q2 by sensing that the battery has been completely charged if the detected voltage of the battery accommodating section 210 is exceeds a reference voltage.

The operation of the control circuit section 500 will be described hereinafter when the AC power supply is applied and is not applied thereto from the AC input section 100, respectively.

First, when AC power supply is applied to the control circuit section 500 from the AC input section 100, the AC-to-DC converter 510 is operated to generate 5V power supply, which is in turn applied to the DC output section 300 and the charge controller 520 to operate the DC output section 300 and the charge controller 520.

At the time, The LED of the second display portion 420 displays the green color to indicate that the output of the DC output section 300 is enabled, and the LED of the first display portion 410 displays the green color when the battery is completely charged.

In the meantime, when AC power supply is not applied to the control circuit section 500 from the AC input section 100, the control circuit section 500 uses the battery installed in the battery accommodating section 210 as an electric power source so as to apply 5V power supply generated from the DC-to-DC converter 530 to the DC output section 300. At this time, a switch is provided in order to prevent the power consumption of the battery in case of not using the DC output section. When the battery is discharged during the use, it may be replaced with new one.

Another characteristic of the present invention is that the DC output section 300 generates a 5V constant voltage, but a current limit 540 is provided to enable the internal battery of various kinds of portable electronic apparatus whose loads have different sizes to effectively charged. The current limit 540 detects the current flowing a resistor R1, and turns a switching element Q4 on when a load is higher than a predetermined value to become a circuit for making PWM be Max-Duty so that it commonly affects the AC-to-DC converter 510 and the DC-to-DC converter 530.

INDUSTRIAL APPLICABILITY

As set forth in the foregoing, according to a portable apparatus combining a battery charger with an emergency power supply according to the present invention, an emergency power supply is supplied irrespective of whether AC power supply is applied to the device from the outside. In addition, since the inventive apparatus can be miniaturized, it is simple and easy to carry around and use. Moreover, a secondary battery such as NiMH or NiCd can be recharged, and the battery installed in the battery accommodating section is used as an electric power source at a place where there is no AC power supply, thereby enabling DC output of a constant voltage to which an overcurrent preventing function is added.

Furthermore, since a current limit for preventing the overcurrent is commonly used for AC and DC, the compactness of the present invention is enabled so that it is convenient to carry around and the production cost is lowered. Also since a USB connector is used, a USB cable generally used by a user is applied to the inventive apparatus so that any electronic device can be used if a USB is provided irrespective of the kind of portable electronic apparatus.

While the present invention has been described with reference to a preferred embodiment, the description is illustrative of the invention and is not to be construed as limiting the invention. Various modifications may occur to those skilled in the art without departing from the true spirit and scope of the invention as defined by the appended claims.

What is claimed is:

1. Apparatus comprising:
an AC-to-DC converter with an AC input and a first DC output node;
a charge controller receiving as an input DC power from the first DC output node and having a charging output node;
a battery compartment disposed to receive a replaceable rechargeable battery;
a DC-to-DC converter with a first DC input node and a second DC output node;
a current limiter with a second DC input node and a third DC output node;
the AC-to-DC converter disposed to receive AC power at its AC input from an AC source, the AC power being fused and passing through an electromagnetic interference filter, thence to a bridge rectifier having an output, the output thereof being capacitively filtered and provided in a pulse-width-modulated manner by means of a first pulse-width modulator to a primary winding of a transformer, the transformer having a secondary winding yielding an electrical output, the electrical output being rectified and filtered, the output providing a feedback signal by means of an optoelectronic coupler to the first pulse-width modulator, the rectified and filtered output comprising the first DC output node;
the charge controller disposed to receive DC power at its input, the DC power coupled by means of a semiconductor switch to the battery compartment by way of the charging output output node, the semiconductor switch controlled by a charge circuit responsive to a voltage measured at the charging output node for controlling the semiconductor switch, the charge circuit providing signals to light-emitting diodes communicating to a human user a charging status of a battery if located in the battery compartment;
the DC-to-DC converter disposed to receive DC power at its first DC input node from the battery compartment, said DC power switched by a manually operated switch, said switched DC power provided to a boost circuit operating in a pulse-width-modulated manner by means of a second pulse-width modulator together with a series inductor, the boost circuit providing boosted DC power to its second DC output node, the boosted DC power providing a feedback signal to the second pulse-width modulator;
the current limiter receiving DC power at its second DC input node from both the first DC output node of the AC-to-DC converter and the second DC output node of the DC-to-DC converter, the current limiter providing feedback to both the first pulse-width modulator of the AC-to-DC converter and the second pulse-width modulator of the DC-to-DC converter, the current limiter further comprising a light-emitting diode communicating to a human user a powered status of the apparatus, the current-limited DC power provided to the third DC output node;
the AC-to-DC converter, the charge controller, the battery compartment, the DC-to-DC converter, and the current limiter all disposed within a body, the AC input comprising a flip-type plug disposed, within the control of a human user, to be retracted inwardly from the body and received in the body when not being used;

the battery compartment having a door disposed to be opened so as to permit installation of a battery therein and disposed to be closed so as to keep such a batter within the compartment;

the third DC output node comprising a universal-serial-bus connector.

2. A method for use with apparatus comprising an AC-to-DC converter with an AC input and a first DC output node; a charge controller receiving as an input DC power from the first DC output node and having a charging output node; a battery compartment disposed to receive a replaceable rechargeable battery; a DC-to-DC converter with a first DC input node and a second DC output node; a current limiter with a second DC input node and a third DC output node; the AC-to-DC converter disposed to receive AC power at its AC input from an AC source, the AC power being fused and passing through an electromagnetic interference filter, thence to a bridge rectifier having an output, the output thereof being capacitively filtered and provided in a pulse-width-modulated manner by means of a first pulse-width modulator to a primary winding of a transformer, the transformer having a secondary winding yielding an electrical output, the electrical output being rectified and filtered, the output providing a feedback signal by means of an optoelectronic coupler to the first pulse-width modulator, the rectified and filtered output comprising the first DC output node; the charge controller disposed to receive DC power at its input, the DC power coupled by means of a semiconductor switch to the battery compartment by way of the charging output output node, the semiconductor switch controlled by a charge circuit responsive to a voltage measured at the charging output node for controlling the semiconductor switch, the charge circuit providing signals to light-emitting diodes communicating to a human user a charging status of a battery if located in the battery compartment; the DC-to-DC converter disposed to receive DC power at its first DC input node from the battery compartment, said DC power switched by a manually operated switch, said switched DC power provided to a boost circuit operating in a pulse-width-modulated manner by means of a second pulse-width modulator together with a series inductor, the boost circuit providing boosted DC power to its second DC output node, the boosted DC power providing a feedback signal to the second pulse-width modulator; the current limiter receiving DC power at its second DC input node from both the first DC output node of the AC-to-DC converter and the second DC output node of the DC-to-DC converter, the current limiter providing feedback to both the first pulse-width modulator of the AC-to-DC converter and the second pulse-width modulator of the DC-to-DC converter, the current limiter further comprising a light-emitting diode communicating to a human user a powered status of the apparatus, the current-limited DC power provided to the third DC output node; the AC-to-DC converter, the charge controller, the battery compartment, the DC-to-DC converter, and the current limiter all disposed within a body, the AC input comprising a flip-type plug disposed, within the control of a human user, to be retracted inwardly from the body and received in the body when not being used; the battery compartment having a door disposed to be opened so as to permit installation of a battery therein and disposed to be closed so as to keep such a batter within the compartment; the third DC output node comprising a universal-serial-bus connector; the method comprising the steps of:

applying AC power to the AC input;

inserting a battery into the battery compartment, the battery not yet fully charged;

charging the first battery by means of the AC power;

at the same time as the charging of the first battery, powering a consumer electronic device from the universal-serial-bus connector, thereby either charging the consumer electronic device or permitting its operation or both;

at a later time, removing the AC power from the AC input;

turning on the switch; and from the first battery, powering the consumer electronic device from the universal-serial-bus connector, thereby either charging the consumer electronic device or permitting its operation or both.

3. The method of claim 2, further comprising the step, carried out at such time as the first battery has been charged, of:

removing the first battery and inserting a second battery not yet fully charged.

4. The method of claim 2, further comprising the step, carried out at such time as the first battery is discharged, of:

replacing the first battery with a second battery; and from the second battery, powering the consumer electronic device from the universal-serial-bus connector, thereby either charging the consumer electronic device or permitting its operation or both.

5. The method of claim 2, wherein the event of a load at the current limiter being higher than a predetermined value brings about a feedback signal to both the first pulse-width modulator of the AC-to-DC converter and the second pulse-width modulator of the DC-to-DC converter, the signal causing one or both of the first pulse-width modulator of the AC-to-DC converter and the second pulse-width modulator of the DC-to-DC converter to provide a maximum duty cycle.

* * * * *